Figure 1:
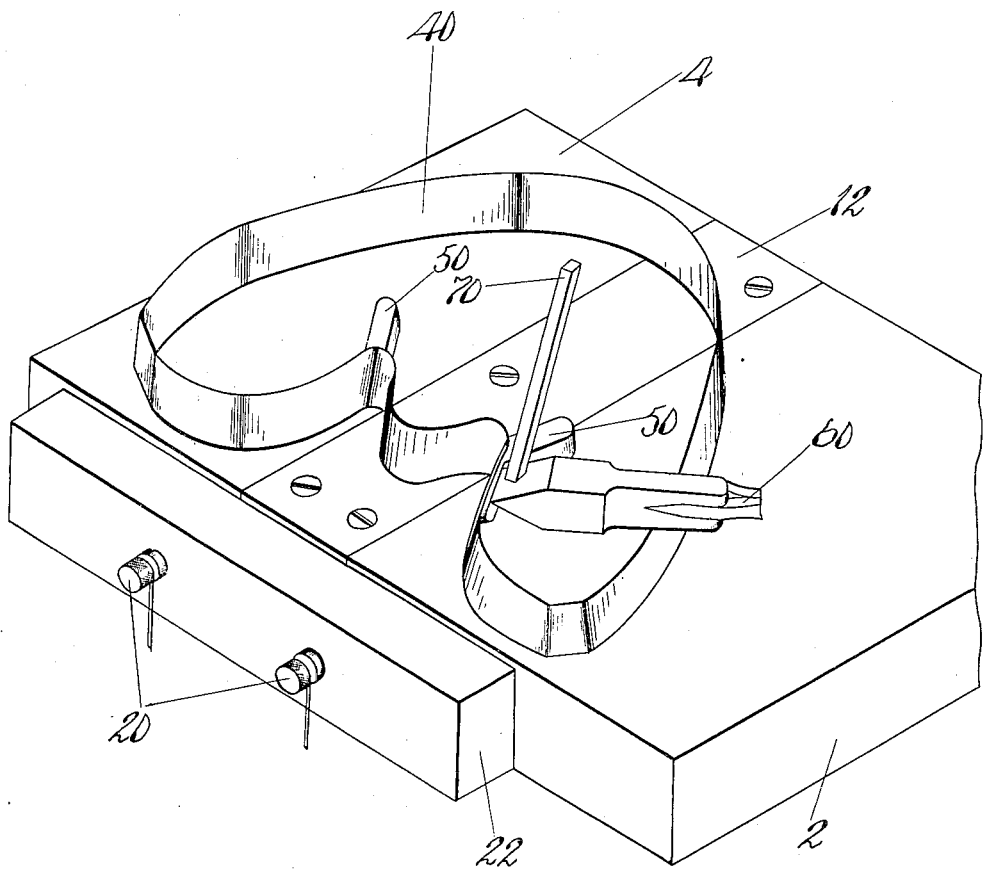

A. R. BRADEN.
APPARATUS FOR SOLDERING METAL PIECES.
APPLICATION FILED JAN. 19, 1911.

1,030,641.

Patented June 25, 1912.

2 SHEETS—SHEET 1.

WITNESSES.
Elizabeth C. Coupe
O. Blanche Hargraves

INVENTOR.
Albert R. Braden
By his Attorney,
Nelson W. Howard

A. R. BRADEN.
APPARATUS FOR SOLDERING METAL PIECES.
APPLICATION FILED JAN. 19, 1911.

1,030,641.

Patented June 25, 1912.
2 SHEETS—SHEET 2.

WITNESSES.
Elizabeth C. Coufe
Blanche Hargraves.

INVENTOR.
Albert R. Braden
By his Attorney,
Nelson W. Howard

UNITED STATES PATENT OFFICE.

ALBERT R. BRADEN, OF BEVERLY, MASSACHUSETTS, ASSIGNOR TO UNITED SHOE MACHINERY COMPANY, OF PATERSON, NEW JERSEY, A CORPORATION OF NEW JERSEY.

APPARATUS FOR SOLDERING METAL PIECES.

1,030,641.   Specification of Letters Patent.   Patented June 25, 1912.

Original application filed December 9, 1909, Serial No. 532,152. Divided and this application filed January 19, 1911. Serial No. 603,525.

*To all whom it may concern:*

Be it known that I, ALBERT R. BRADEN, a citizen of the United States, residing at Beverly, in the county of Essex and Commonwealth of Massachusetts, have invented certain Improvements in Apparatus for Soldering Metal Pieces, of which the following description, in connection with the accompanying drawings, is a specification, like characters on the drawings indicating like parts in the several figures.

The present invention relates to an improved apparatus for use in producing soldered joints between metal pieces, and particularly where it is essential that the pieces should be united accurately in a predetermined relation. The improved apparatus may be employed with particular advantage in the manufacture of cutting dies, such as are used with a clicking press for dieing out upper leather, although the invention is in no sense limited to this use but has a wider range of application.

Dies of the type mentioned are usually constructed of strip steel, bent to conform in contour with the outline desired in the blanks and having one or both edges sharpened for cutting. It is customary to equip such dies with marking devices for indicating the location of the adjacent blanks in an assembled upper, the amount by which one blank should overlap the next, or other characteristics of the blank and to mount such marking devices on brackets attached to the sides of the die. In attaching such a bracket to a die great precision is neecssary in locating it at the proper point with respect to the cutting edge of the die, as otherwise the marking device would be improperly positioned and inaccuracies would occur in assembling the upper which would render difficult the remaining operations in the manufacture of the shoe and also impair the appearance of the finished article.

Heretofore the attempt has been made to solder the brackets for carrying marking devices to the die by the usual methods of hand soldering. Such methods have proved unsatisfactory, as applied to the manufacture of dies, for several reasons. In the first place, it has been found difficult to cause the melted solder to flow completely through between the adjacent faces of the bracket and die and imperfect joints have frequently resulted which were liable to break when the finished die was subjected to heavy blows of a clicking press. Such results are due partly to the fact that it is difficult, in dealing with relatively thick metal pieces, to heat them uniformly to the required temperature at every part of the joint, and if the proper conditions of temperature are not attained, the solder hardens after running into the joint for a short distance instead of spreading uniformly as it should to form a perfect joint. This has been particularly noticeable when the attempt has been made to solder the metal pieces on a cold master plate, as under these conditions the chilling effect of the plate has prevented the melted solder from approaching the lower edge of the joint. On the other hand, if the metal pieces are over heated the solder runs freely through between the parts, not enough remaining to form a strong joint. The methods of hand soldering have proved unsatisfactory also in point of accuracy, especially as applied to the manufacture of dies. Where the attempt has been made to hold the die and bracket in the proper relation during the soldering operation by hand or by a mechanical clamp, it has been found very difficult to avoid a slight twisting or slipping of the bracket before the solder has hardened. It has been difficult also to unite the bracket and die with their back or upper surfaces in a single plane.

It is the object of the present invention to provide an apparatus by the use of which the defects above discussed may be avoided and an accurate and perfect joint made between metal pieces.

To this end a feature of the invention consists in the provision of a master plate upon which the pieces to be soldered may be arranged, the master plate having heating means whereby the pieces may be warmed preparatory to the soldering operation. A preferred manner of heating the master plate consists in employing electric heating coils inserted in recesses disposed below its surface. By this means the temperature of the pieces may be conveniently and accurately regulated, the pieces being maintained preferably at a temperature somewhat below the melting point of solder. In addition to insuring that the solder applied to the upper edge of the joint shall spread uniformly to the lower edge thereof, the employment of a heated master plate results in an equal cooling of the solder throughout the joint and so obviates the danger of the joint being broken by setting and resulting contraction of the solder in one part of the joint before another.

Another feature of the invention consists in provision whereby the pieces to be soldered may be magnetically clamped in the position in which it is desired to unite them. In the construction herein shown, means are provided for magnetizing the master plate. To this end the plate is formed in sections each of which constitutes one pole of an electromagnet and a pole changing switch is arranged in circuit with the coils of the electromagnet whereby the plate may be rapidly demagnetized when it is desired to remove the soldered pieces. The magnetic gap between the sections of the master plate will be filled and the surface of the master plate made continuous by a bar of aluminum or the material upon which solder will not readily stick.

In the apparatus herein illustrated the heating coils are inserted within the body of the plate and the electromagnet is located between supports which hold it at a distance from the plate. By this arrangement air is allowed to circulate about the electromagnet and between it and the master plate. The magnet therefore is kept comparatively cool and is not subjected to the intense heat of the master plate or of the heating coils. Another advantage incident to utilizing separate heating and magnetizing coils is that different currents may be thus easily employed in the different coils, for example, a direct current could be used to the best advantage in the coils of the magnet while an alternating current might be preferred in the heating coils.

A method of soldering metal pieces in which the present apparatus may be employed to a good advantage is disclosed and claimed in my co-pending application Serial No. 532,152 of which the present application is a division.

Figure 2:
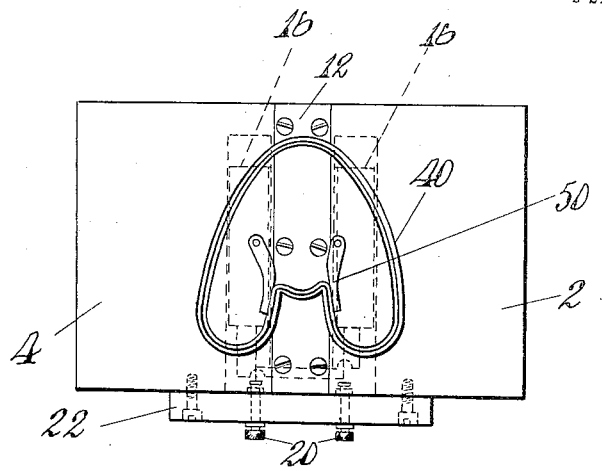
Figure 3:
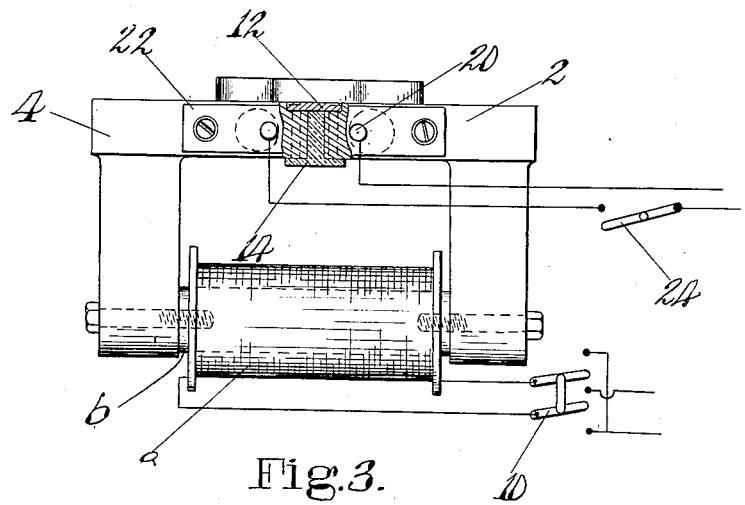

The features of invention above referred to and other features hereinafter described and defined in the claims, will be clearly apparent to those skilled in the art from the following description of a preferred embodiment of the inventions selected for purposes of illustrations and shown in the accompanying drawings, in which, Figure 1 is a view in perspective of the apparatus, and shows a die and bracket in position to receive melted solder. Fig. 2 is a plan view of the apparatus and die shown in Fig. 1. Fig. 3 is a similar view in elevation showing a part of the master plate in section.

The apparatus consists in a flat plate having provision whereby it may be heated and magnetized. To this end an iron or soft steel plate is made in two separate sections 2 and 4, each having a heavy downwardly extending lug formed integral therewith. Extending between the lugs and bolted thereto is a soft iron core 6 for the coil 8 which thus constitutes a powerful electromagnet having for its poles the sections 2 and 4 of the plate. A pole changing switch 10 is located in the circuit between the coil 8 and the source of current and by this means the direction of the current through the coil and therefore the polarity of the sections 2 and 4 may be reversed at will. The gap between the adjacent edges of the plate sections 2 and 4 is filled by any suitable non-magnetic material. In the present case a bar 12 of aluminum is fitted in grooves in the sections and extends across the upper part of the gap forming a continuous surface with the surface of the plate sections, all three components being accurately surfaced to form a master plate. The lower portion of the gap is filled by a T-bar of brass or other suitable substance which is attached to the aluminum bar 12 by bolts extending through the adjacent edges of the sections 2 and 4.

The employment of aluminum in the construction of the bar 12 is particularly advantageous in the present connection, in that superfluous solder falling upon this part of the plate will not stick to the aluminum as it would stick to brass or other available non-magnetic metal.

The arrangement above described is such that iron or steel articles placed in any position on the plate are powerfully attracted toward it, although, of course, a particularly powerful attraction is developed by locating the article in position to bridge the magnetic gap, as, in that case the article forms part of a closed magnetic circuit and is attracted by both poles of the magnet. As illustrated in the drawings, therefore, the die 40 is located in position to bridge the magnetic gap and the brackets 50 to be soldered to the die are arranged in the positions they are to occupy in finished die. When the magnet is energized the die and the brackets will be drawn tightly against the master plate and rigidly held while the current continues to flow. By employing the pole changing switch 10 for reversing the direction of the current through the coil 8 the plate may be rapidly demagnetized and the die released. In addition to the attraction between the master plate and the die and between the master plate and the brackets, magnetism is induced in the die and brackets so that they tend to draw together although to a lesser degree than toward the master plate.

For the purpose of heating the master plate, each section is recessed transversely for the reception of a heating coil 16 which coil may be of any suitable or desired commercial form and require no particular description. The heating coils 16 are connected in parallel with the terminals 20 which are mounted in a bar 22 bolted or otherwise rigidly attached to the front of the master plate, the bar also serving to close the end of the recesses for the heating coil. A switch 24 is provided in circuit with the heating coil for cutting off the current when the apparatus is not in use or if the plate becomes too hot. The size of the heating coil is such that the temperature of the master plate may be maintained at a point somewhat below the melting point of the solder being used, and such temperature will in no case be found high enough to materially effect the magnetic properties of the master plate.

The apparatus of the present invention may be used for soldering a bracket to a die in the following manner. The switch 24 is first closed and the master plate is allowed to become heated. The die 40 and the brackets 50 which are to be soldered to the die are then treated with a proper soldering flux, arranged in their proper relation upon the master plate and the switch 10 closed, allowing the current to flow through the coil 8 in one direction or the other, thereby magnetizing the master plate and clamping the die and brackets to it and together. Melted solder is then applied to the upper edge of the joint and allowed to run through the master plate, spreading uniformly over the area of the joint. To this end a soldering iron 60 is employed in the usual manner to heat the bracket and die at the joint and to melt solder from a stick 70. After the melted solder has run completely through the joint the iron 60 is removed and the solder allowed to set. The completed die may now be removed from the master plate which is demagnetized by reversing the switch 10.

By employing the novel apparatus in the manner above described, it will be seen that brackets may be attached to a die accurately and rigidly as well as more expeditiously than it has been heretofore possible by hand methods, to effect accurate union between metal pieces.

The nature of the present invention having been indicated, what is claimed as new and desired to secure by Letters Patent of the United States is:—

1. An apparatus of the class described, comprising a master plate, heating means therefor, and separate means for magnetizing said master plate.

2. An apparatus of the class described comprising a master plate having a magnetic gap, heating means, separate means for magnetizing said master plate, and separate controlling devices for the heating and magnetizing means.

3. An apparatus of the class described comprising a master plate having a magnetic gap in its surface, non-magnetic filling means therefor forming a continuous surface with the master plate, heating means within said master plate, and means for magnetizing said master plate, the magnetizing means being located at a point remote from the heating means.

4. An apparatus of the class described comprising a master plate having a continuous plane surface, a section to which solder will not stick, and heating means contained within said master plate.

5. An apparatus of the class described comprising a master plate having an aluminum section in its surface, heating means, and means for magnetizing said master plate.

6. An apparatus of the class described comprising a sectional plate, an electromagnet connecting the sections of said plate, and heating means therefor.

7. An apparatus of the class described comprising a sectional plate, lugs extending from the sections of said plate, an electromagnet mounted between said lugs, and means for reversing the current through said electromagnet.

8. An apparatus of the class described comprising a sectional plate, a heating coil located in each section of the plate, and a single electromagnet for magnetizing the sections thereof.

9. An apparatus of the class described comprising a plate having alternate sections of magnetic and non-magnetic metals which form a horizontal work supporting surface, heating means, and an electromagnet for magnetizing the alternate sections of said plate.

10. An apparatus of the class described comprising an electromagnetic master plate for clamping metal pieces in the desired relative position, said master plate being composed of spaced sections the surfaces of which form a horizontal work supporting surface, an electromagnet connecting said sections, and a non-magnetic filling for the space between said sections which forms a continuous surface with the surface of the sections.

11. An apparatus of the class described, comprising a master plate, heating coils within the body of the plate, and an electromagnet connected to the plate and maintained spaced from the plate.

12. A master plate comprising two iron sections having parallel shoulders formed in their proximate edges, an intermediate bar of non-magnetic metal supported by the shoulders and forming with the surfaces of the sections a continuous work supporting surface, and an electromagnet connecting the iron sections.

In testimony whereof I have signed my name to this specification in the presence of two subscribing witnesses.

ALBERT R. BRADEN.

Witnesses:
CHESTER E. ROGERS,
HERBERT W. KENWAY.